United States Patent [19]

Schilling et al.

[11] Patent Number: 4,545,959

[45] Date of Patent: Oct. 8, 1985

[54] TREATMENT CHAMBER WITH FLUIDIZED BED

[75] Inventors: Hans-Dieter Schilling, Hattingen; Lothar Holl, Essen, both of Fed. Rep. of Germany

[73] Assignee: Bergwerksverband GmbH, Essen, Fed. Rep. of Germany

[21] Appl. No.: 501,775

[22] Filed: Jun. 7, 1983

[30] Foreign Application Priority Data

Jun. 8, 1982 [DE] Fed. Rep. of Germany ....... 3221567

[51] Int. Cl.⁴ .......................... B01J 8/18; F27B 15/00
[52] U.S. Cl. ...................................... 422/142; 34/10; 34/57 A; 422/143; 422/145; 422/146; 422/230; 431/7; 431/170; 432/15; 432/58
[58] Field of Search ............... 422/142, 143, 145, 146, 422/116, 230, 231; 431/7, 170; 432/15, 58; 34/57 A, 10

[56] References Cited

U.S. PATENT DOCUMENTS

| | | |
|---|---|---|
| 2,838,382 | 6/1958 | Ringgenberg ................ 422/145 X |
| 2,946,572 | 7/1960 | Annis . |
| 3,385,199 | 5/1968 | Smith, Jr. . |
| 3,669,318 | 6/1972 | Goksel . |
| 4,071,304 | 1/1978 | Chauvin . |
| 4,165,568 | 8/1979 | Gibert et al. ..................... 432/58 X |
| 4,338,283 | 7/1982 | Sakamoto et al. ............... 422/145 X |
| 4,425,303 | 1/1984 | Schilling et al. .................... 422/142 |

FOREIGN PATENT DOCUMENTS

| | | |
|---|---|---|
| 81104198 | 9/1981 | European Pat. Off. . |
| 0041648 | 12/1981 | European Pat. Off. . |
| 0042095 | 12/1981 | European Pat. Off. . |
| 3022441 | 1/1982 | Fed. Rep. of Germany . |
| 3027517 | 2/1982 | Fed. Rep. of Germany . |
| 3101942 | 9/1982 | Fed. Rep. of Germany . |
| 1407833 | 9/1975 | United Kingdom . |

Primary Examiner—Barry S. Richman
Assistant Examiner—William R. Johnson
Attorney, Agent, or Firm—Karl F. Ross; Herbert Dubno

[57] ABSTRACT

A chamber for the treatment of particulate matter in a fluidized bed, e.g. at elevated temperatures, comprises an apertured bottom for the admission of carrier gas into the overlying space. The latter is divided by upstanding partitions into at least one medial compartment and at least two additional compartments adjoining the at least one medial compartment at the opposite sides of the latter. The apparatus further comprises a duct of substantially triangular cross-section with a horizontal base and an upwardly sloping side walls located in the at least one medial compartment, with the side walls of the duct extending in directions parallel to the partitions, and the base of the duct being imperforate and resting on the wall of the chamber and preventing the entry of the carrier gas into the at least one medial compartment from below; and a nozzle arrangement in each of the upwardly sloping side walls of the duct. The partitions may be formed from louvres generally parallel to the axes of nozzles through which a flow of ancillary gas is directed from a duct in a given compartment into two adjoining compartments; particles descending from above into that given compartment are thus entrained by the ancillary gas into the adjoining compartments.

2 Claims, 2 Drawing Figures

TREATMENT CHAMBER WITH FLUIDIZED BED

FIELD OF THE INVENTION

Our present invention relates to an apparatus for the treatment of a particulate mass, specifically a chamber containing a fluidized bed, and to a method of operating same.

BACKGROUND OF THE INVENTION

Fluidized beds are frequently utilized for the treatment —by heat or in some other manner—of bulk material whose particles are to remain suspended in a given environment for an extended period. The state of suspension is maintained by a carrier gas which tends to keep the particles in motion and separated from one another. This separation is important for the desired reaction, e.g. a combustion of carbon granules which may widely vary in particle size.

Not infrequently, however, smaller particles react only incompletely or not at all before being entrained out of the treatment zone by the carrier gas. This problem has been recognized in commonly owned European patent application 0,042,095, published 23 Dec. 1981, which proposes as a solution therefor the provision of a treatment chamber with an apertured bottom overlying a wind box through which carrier gas is admitted into the chamber, the latter being subdivided by several upright partitions into a plurality of juxtaposed compartments including at least one bounded by a substantially solid portion of the chamber bottom. The partitions have openings through which the mass can circulate in vertical loops after being fed from above into the compartment or compartments into which the carrier gas is more or less prevented from penetrating; the pressure differential between the latter compartments and the adjoining ones, subject to the updraft of the rising carrier gas, causes the aforementioned circulation. The European application also discloses deflectors of triangular cross-section, disposed at the bottom of any down-flow compartment, which direct the descending particles into the adjoining compartments under or through the intervening partitions. The latter, as further described in that application, may be formed by louvres slanting down toward the more or less aperture-free bottom portions.

While the described system is generally satisfactory, we have found that its mode of operation is not always reliable to the extent required under certain conditions, e.g. when it is necessary to burn residual carbon particles in a mass of ash.

OBJECTS OF THE INVENTION

An important object of our invention is to provide an improved treatment apparatus of the type referred to.

A related object is to provide a method of implementing this improvement.

SUMMARY OF THE INVENTION

A treatment chamber according to our invention differs from that of the above-identified European patent application by the provision of nozzle means near its apertured bottom for directing an ancillary gas generally upwardly into at least two compartments laterally adjoining a medial compartment—preferably underlain by a substantially solid bottom portion —into which the particles to be treated are fed from above, this ancillary gas thus promoting the establishment of local circulation through and/or around the partitions defining that compartment. The nozzle means may comprise one or more nozzles in the vicinity of the lower end of each partition; alternatively, they may be provided in sloping sides of a duct of substantially triangular cross-section, similar to the deflectors disclosed in the European application.

BRIEF DESCRIPTION OF THE DRAWING

The above and other features of our invention will now be described in detail with reference to the accompanying drawing in which.

SPECIFIC DESCRIPTION

Figure 1:
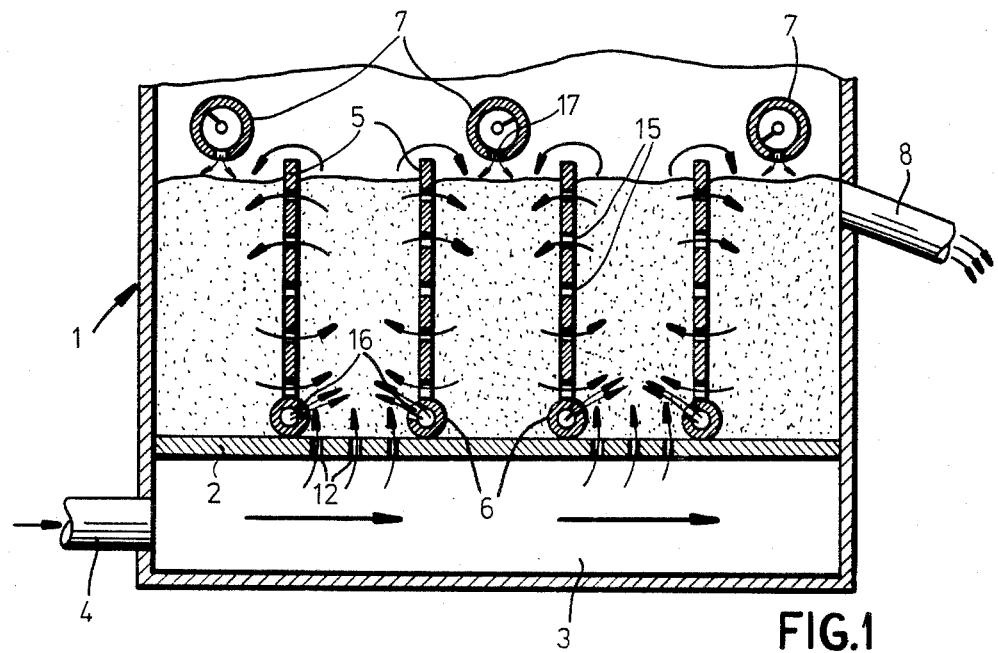
FIG. 1 is a somewhat diagrammatic sectional view of a treatment chamber embodying our invention.

In FIG. 1 we have shown a prismatic treatment chamber 1 with solid lateral walls and a falsebottom 2 designed as a distributor plate with apertures 12 (which usually are shielded from above, though this has not been illustrated), defining with the actual bottom of the enclosure a wind box 3 with an inlet 4 for a carrier gas, possibly a flue gas. The space above bottom 2 is divided by upright partitions 5 into several juxtaposed compartments, here five, three of which are overlain by downwardly open supply tubes with feedscrews 7 for the discharge of the particulate mass to be treated. The partitions have openings 15 through which the particles can circulate in a multiplicity of local loops under the action of streams of ancillary gas—e.g. air—emitted by tubular nozzles 6 that are disposed just below each parition, these nozzles having discharge holes or slots 16 sloping upward into the compartments adjoining those to which the particles are fed by gravity from above. It will be noted that the portions of bottom 2 underlying these latter compartments are solid. The treated particles are carried out by the gas through an outlet 8.

Figure 2:
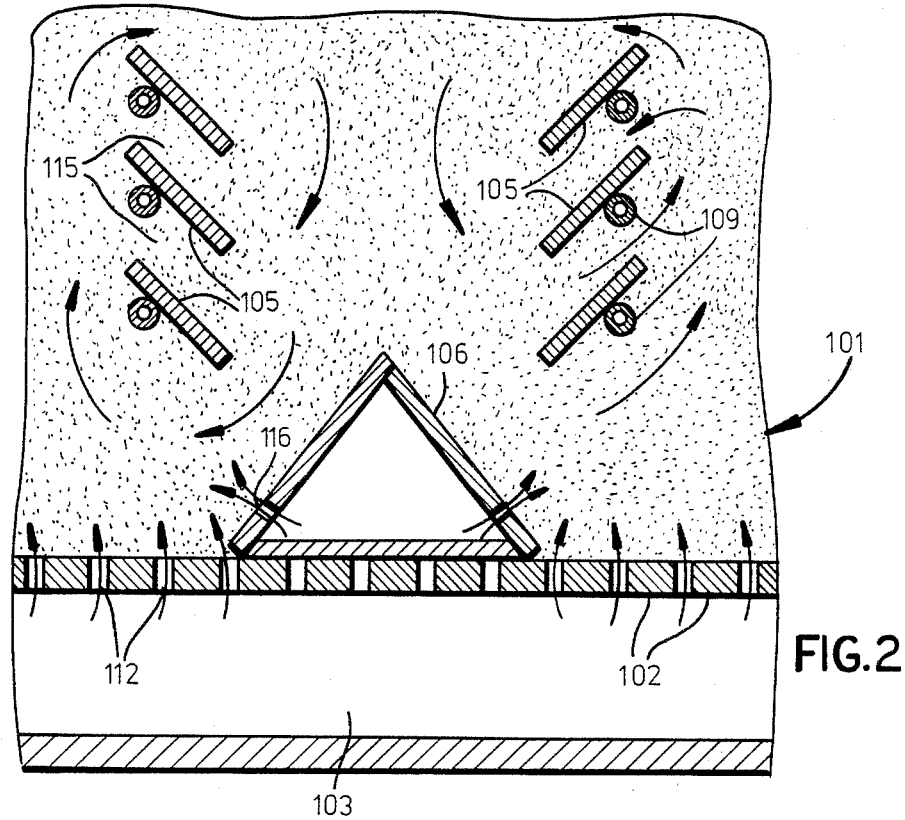
FIG. 2 is a fragmentary sectional view of a modified chamber according to this invention.

In FIG. 2, where elements analogous to those of FIG. 1 are identified by like reference numerals preceded by a "1" in the position of the hundreds digit, the nozzles 116 are holes or slots formed in sloping walls of a deflector 106 constituted by a duct of triangular cross-section lying in a medial compartment overlain by a nonillustrated feeder such as the screws 7 of the preceding embodiment. Partitions 105 are here formed by respective sets of louvres, sloping toward deflector 106 in a direction substantially parallel to the axes of confronting nozzles 116, which are spaced from each other in the vertical direction and are supported by conduits 109 carrying a temperature-controlling fluid as known per se from the European application referred to. The sloping side walls of the duct extend in directions parallel to the partitions, and the base of the duct is imperforate and ensures that no carrier gas can enter the medial compartment from below through the bottom wall 102. Thus, as in the embodiment of FIG. 1, local circulations are generated through the gaps 115 separating the louvres 105 as well as, possibly, around the entire partitions. The intensity of the flow of ancillary gas can be adjusted to suit particular conditions.

We claim:

1. An apparatus for treating a particulate mass, comprising:

a chamber bounded by imperforate lateral walls and an apertured bottom wall;

a source of carrier gas under pressure communicating with the interior of said chamber through said bottom wall;

a plurality of partitions in said chamber dividing the space above said bottom wall into at least one medial compartment and at least two additional compartments adjoining said at least one medial compartment at the opposite sides of said medial compartment, each of said partitions including a respective set of louvres spaced from each other in the vertical direction and slanted downwardly towards said at least one medial compartment, and said louvres of each set defining therebetween and between the lowest louvre and said bottom wall a plurality of openings establishing communication through the respective partition between directly adjacent compartments;

feed means located at an elevated level above said bottom wall for introducing a mass of particles to be treated into said at least one medial compartment;

a duct of substantially triangular cross-section with a horizontal base and upwardly sloping side walls located in said at least one medial compartment, said side walls of said duct extending in directions parallel to said partitions, and said base of said duct being imperforate and resting on said bottom wall and preventing the entry of said carrier gas into said at least one medial compartment from below; and a respective nozzle arrangement in each of said upwardly sloping side walls of said duct, each nozzle arrangement being located adjacent the juncture between its respective sloping side wall and said base and in the vicinity of and below the lowermost louvre of the proximate one of said partitions, said nozzle arrangements having each nozzle axis thereof oriented at an upward slant relative to said bottom wall for directing an ancillary gas from said duct generally upward into said at least two additional compartments adjoining said at least one medial compartment to create a pressure differential between said medial compartment and each of its adjoining additional compartments, said nozzle arrangements ensuring the circulation of particles in said chamber by said carrier gas and said ancillary gas along a plurality of local loops generally rising in said adjoining additional compartments and descending in said at least one medial compartment.

2. An apparatus as defined in claim 1 wherein the planes of said louvres are substantially parallel to the axes of the nozzle arrangements.

* * * * *